United States Patent [19]
Kim

[11] Patent Number: 5,841,569
[45] Date of Patent: *Nov. 24, 1998

[54] METHOD OF MANUFACTURING AN ARRAY OF THIN FILM ACTUATED MIRRORS

[75] Inventor: Dong-Kuk Kim, Seoul, Rep. of Korea

[73] Assignee: Daewoo Electronics Co., Ltd., Seoul, Rep. of Korea

[ * ] Notice: The term of this patent shall not extend beyond the expiration date of Pat. No. 5,608,569.

[21] Appl. No.: 774,835

[22] Filed: Dec. 27, 1996

Related U.S. Application Data

[63] Continuation of Ser. No. 504,874, Jul. 20, 1995, Pat. No. 5,608,569.

[30] Foreign Application Priority Data

Jul. 21, 1994 [KR] Rep. of Korea .................. 1994-17571

[51] Int. Cl.$^6$ .................................................. G02B 26/00
[52] U.S. Cl. .......................... 359/291; 359/224; 359/850
[58] Field of Search ..................................... 359/290, 291, 359/295, 224, 850, 900; 437/229

[56] References Cited

U.S. PATENT DOCUMENTS 5,608,569 3/1997 Kim ......................................... 359/291

Primary Examiner—Georgia Y. Epps
Assistant Examiner—Dawn-Marie Bey
Attorney, Agent, or Firm—Pennie & Edmonds LLP

[57] ABSTRACT

An improved method for manufacturing an array of M×N thin film actuated mirrors comprises the steps of: providing an active matrix including M×N connecting terminals; constructing a thin film sacrificial layer on the top surface of the active matrix; removing portions of the thin film sacrificial layer surrounding each of the connecting terminals; forming a supporting member in each of the removed portions to thereby form a supporting layer; forming an elastic layer on top of the supporting layer; structuring a conduit in each of the supporting members and the elastic layer; depositing a second thin film layer on top of the elastic layer; patterning the second thin film layer into M×N second thin film electrodes; forming a thin film electrodisplacive layer on top of the second thin film electrodes and the elastic layer; patterning the thin film electrodisplacive layer into M×N thin film electrodisplacive members; patterning the elastic layer into M×N elastic members; depositing a first thin film layer thereon; patterning the first thin film layer into M×N first thin film electrodes; and removing the thin film sacrificial layer to thereby form the array of M×N thin film actuated mirrors.

8 Claims, 8 Drawing Sheets

METHOD OF MANUFACTURING AN ARRAY OF THIN FILM ACTUATED MIRRORS

This is a continuation of application Ser. No. 08/504,874, filed Jul. 20, 1995, now U.S. Pat. No. 5,608,569.

FIELD OF THE INVENTION

The present invention relates to an optical projection system; and, more particularly, to an improved method for manufacturing an array of MxN thin film actuated mirrors for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., MxN, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1J, there are illustrated the manufacturing steps involved in manufacturing an array 100 of MxN thin film actuated mirrors 101, wherein M and N are integers, disclosed in a copending commonly owned application, U.S. Ser. No. 08/430,628, entitled "THIN FILM ACTUATED MIRROR ARRAY".

The process for manufacturing the array 100 begins with the preparation of the active matrix 102 having a top surface 120, comprising a substrate 108, an array of MxN transistors (not shown) and an array 109 of MxN connecting terminals 110, as shown in FIG. 1A.

In the subsequent step, there is formed on the top surface 120 of the active matrix 102 a thin film sacrificial layer 121 by using a sputtering or an evaporation method if the thin film sacrificial layer 121 is made of a metal, a chemical vapor deposition(CVD) or a spin coating method if the thin film sacrificial layer 121 is made of a phosphor-silicate glass(PSG), and a CVD method if the thin film sacrificial layer 121 is made of a poly-Si, as illustrated in FIG. 1B.

Subsequently, there is formed a first supporting layer 122 including the array 103 of MxN supporting members 104 and the thin film sacrificial layer 121, wherein the first supporting layer 122 is formed by: creating an array of MxN empty slots(not shown) by using a photolithography method, each of the empty slots being located around each of the connecting terminals 110; and forming a supporting member 104 in each of the empty slots located around each of the connecting terminals 110, by using a sputtering or a CVD method, as shown in FIG. 1C.

In the following step, an elastic layer 55 made of an insulating material is formed on top of the thin film sacrificial layer 121 including the supporting members 104.

Thereafter, a conduit 54 made of a metal is formed in each of the supporting members 104 by: first creating a hole(not shown), the hole extending from top of the elastic layer 55 to top of the connecting terminal 110, by using an etching method; and filling therein with the metal, as depicted in FIG. 1D.

Subsequently, as shown in FIG. 1E, a second thin film layer 123 made of an electrically conducting material is formed on top of the elastic layer 55 including the MxN conduits 54 by using a sputtering method. The second thin film layer 123 is electrically connected to the MxN transistors through the conduit 54 formed in each of the supporting members 104.

Thereafter, as shown in FIG. 1F, a thin film electrodisplacive layer 125 made of a piezoelectric material or an electrostrictive material is formed on top of the second thin film layer 123 by using a Sol-Gel, a sputtering or a CVD method to thereby form a semifinished actuating structure 150.

In the ensuing step, as depicted in FIG. 1G, the elastic layer 55, the second thin film layer 123 and the thin film electrodisplacive layer 125 of the semifinished actuating structure 150 are patterned by using a photolithography or a laser trimming method until the first supporting layer 122, including the array 103 of MxN supporting members 104 and the thin film sacrificial layer 121, is exposed to thereby form an array 151 of MxN semifinished actuated mirror structures 152, wherein each of the semifinished actuated mirror structures 152 includes an electrodisplacive layer 154, a second electrode layer 153 and an elastic member 155.

Thereafter, the electrodisplacive layer 154 in each of the semifinished actuated mirror structures 152 is heat treated to allow a phase transition to take place.

In the subsequent step, as depicted in FIG. 1H, a first electrode layer 126 made of an electrically conducting and light reflecting material is formed on top of the electrodisplacive layer 154 in each of the semifinished actuated mirror structures 152 by using a sputtering method, resulting in an array 164 of MxN actuated mirror structures 166, wherein each of the actuated mirror structures 166 includes a top and four side surfaces.

In the following step, the top and the four side surfaces in each of the actuated mirror structures 166 are completely covered with a thin film protection layer 160 made of a photoresist, $SiO_2$ or silicon nitride to thereby form an array 167 of MxN protected actuated mirror structures 168, as shown in FIG. 1I.

The thin film sacrificial layer 121 of the first supporting layer 122 is then removed by using an etching method. The removal of the thin film sacrificial layer 121 in each of the protected actuated mirror structures 168 is followed by the removal of the thin film protected layer 160 therein, to thereby form the array 100 of MxN thin film actuated mirrors 101, as shown in FIG. 1J.

There are a number of problems associated with the above described method for manufacturing the array 100 of MxN thin film actuated mirrors 101. The first and foremost to be mentioned is the formation of the thin film protection layer 160 which may further compound the already complicated overall manufacturing process.

Furthermore, the etchant or the chemical used in the removal of the thin film sacrificial layer 121 of the first supporting layer 122 might chemically attack the thin film layers constituting the thin film actuated mirrors 101, degrading the structural integrity and the performance thereof which will, in turn, degrade the overall performance of the array 100.

SUMMARY OF THE INVENTION

It is, therefore, a primary object of the invention to provide a method for manufacturing an array of M×N thin film actuated mirrors which minimizes the possibility of chemical attacks on the thin film layers constituting each of the thin film actuated mirrors during the removal of the thin film sacrificial layer in the supporting layer.

In accordance with one aspect of the present invention, there is provided an improved method for manufacturing an array of thin film actuated mirrors, the method comprising the steps of: providing an active matrix having a top surface, the active matrix including an array of M×N connecting terminals on the top surface thereof, a substrate and an array of M×N transistors; constructing a thin film sacrificial layer on the top surface of the active matrix in such a way that the thin film sacrificial layer completely covers the array of M×N connecting terminals; removing portions of the thin film sacrificial layer surrounding each of the connecting terminals; forming a supporting member around each of the connecting terminals by filling the portions with a first insulating material to thereby form a supporting layer comprising an array of M×N supporting members and the thin film sacrificial layer; depositing an elastic layer, made of a second insulating material, on top of the supporting layer; forming a conduit in each of the supporting members, each of the conduits extending from top of the elastic layer, passing through each of the supporting members, to top of each of the connecting terminals; depositing a second thin film layer made of an electrically conducting material on top of the elastic layer; patterning the second thin film layer into an array of M×N second thin film electrodes, wherein each of the second thin film electrodes is electrically connected to each of the conduits; forming a thin film electrodisplacive layer on top of the array of M×N second thin film electrodes and the elastic layer; heat treating the thin film electrodisplacive layer to allow a phase transition to take place; patterning the thin film electrodisplacive layer into an array of M×N thin film electrodisplacive members, each of the thin film electrodisplacive members surrounding each of the second thin film electrodes; patterning the elastic layer into an array of M×N elastic members; depositing a first thin film layer on top of the thin film electrodisplacive members, the elastic members and the supporting layer; patterning the first thin film layer into an array of M×N first thin film electrodes, wherein each of the first thin film electrodes surrounds each of the thin film electrodisplacive members and covers portions of each of the elastic members; and removing the thin film sacrificial layer to thereby form the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1A:
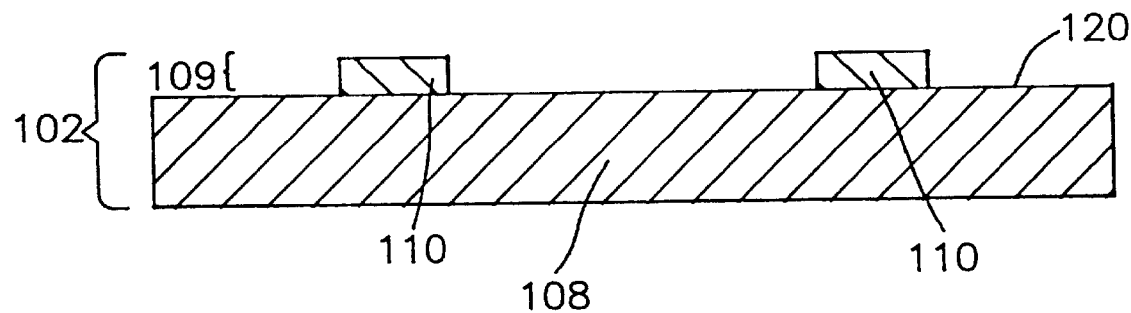
FIGS. 1A to 1J illustrate schematic cross sectional views setting forth the manufacturing steps for the array of M×N thin film actuated mirrors previously disclosed.
Figure 1B:
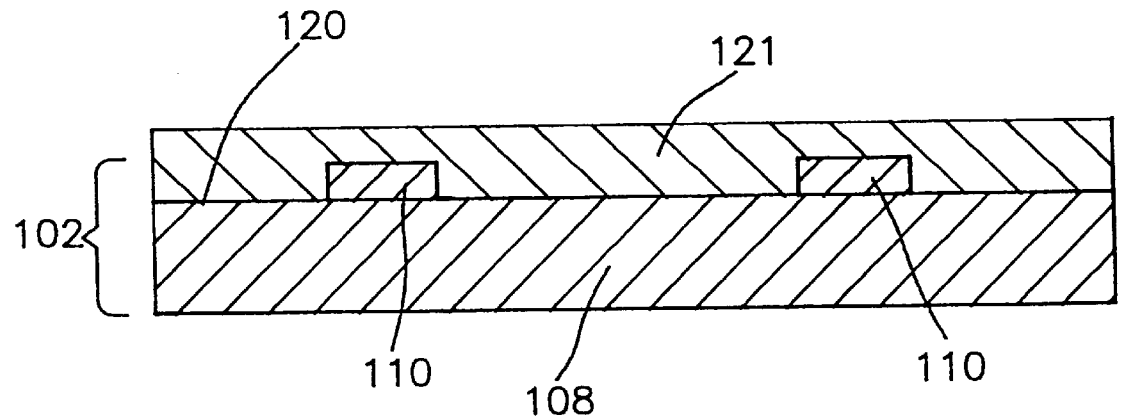
Figure 1C:
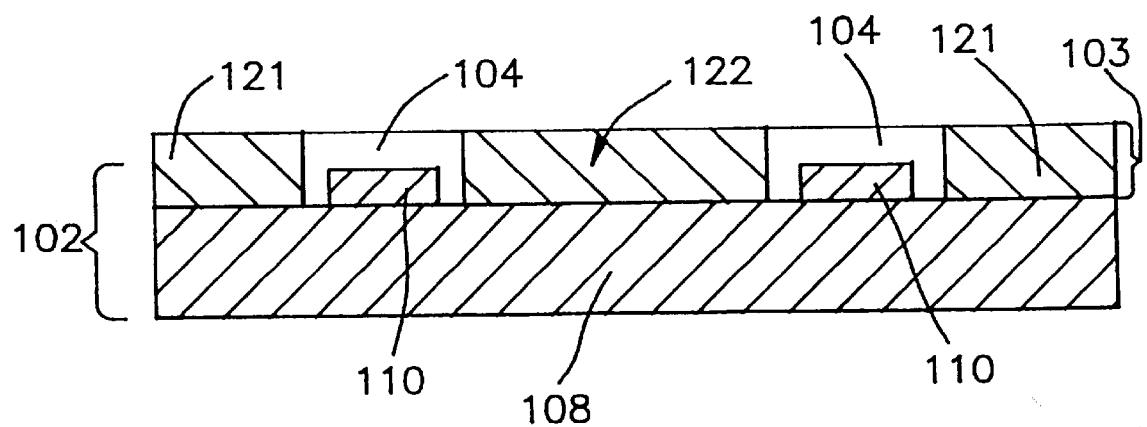
Figure 1D:
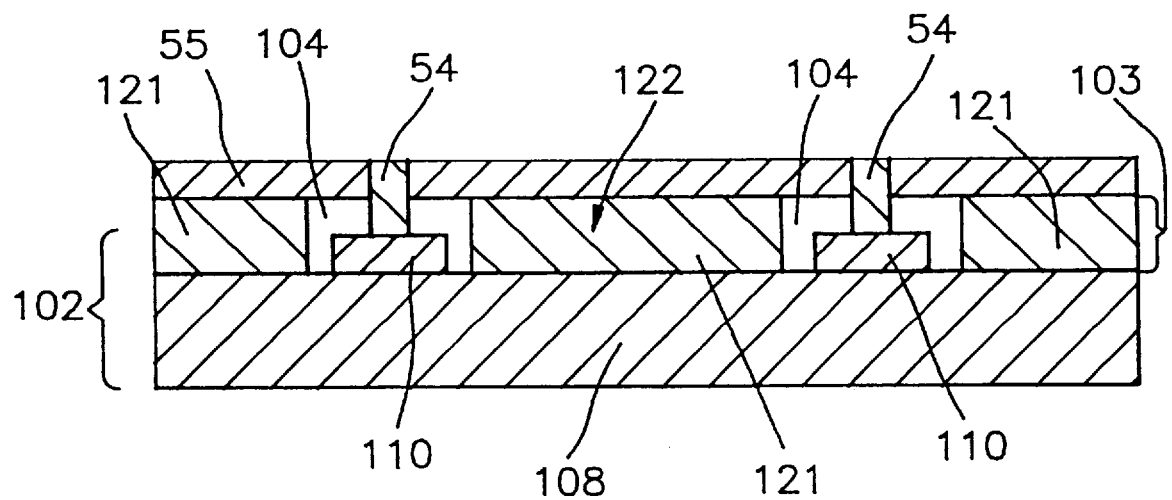
Figure 1E:
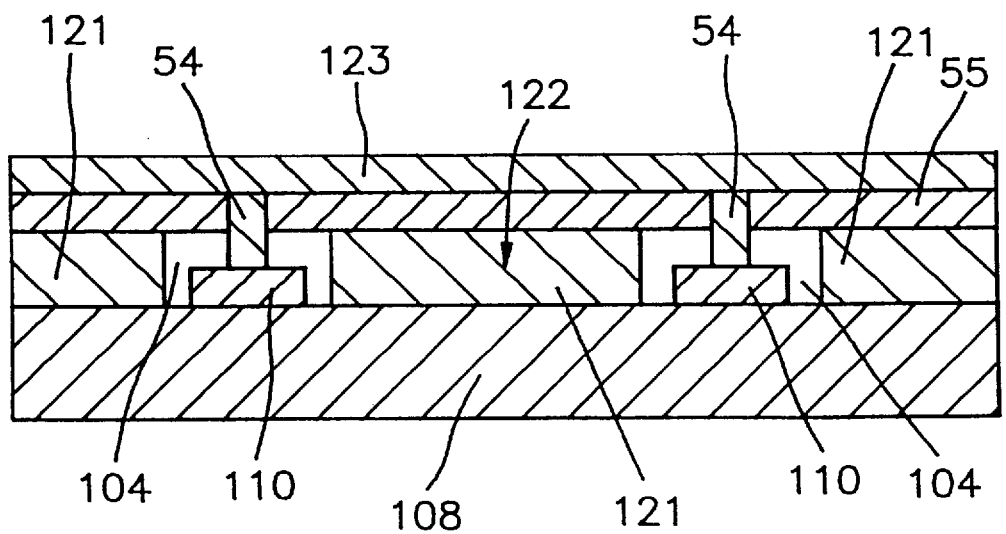
Figure 1F:
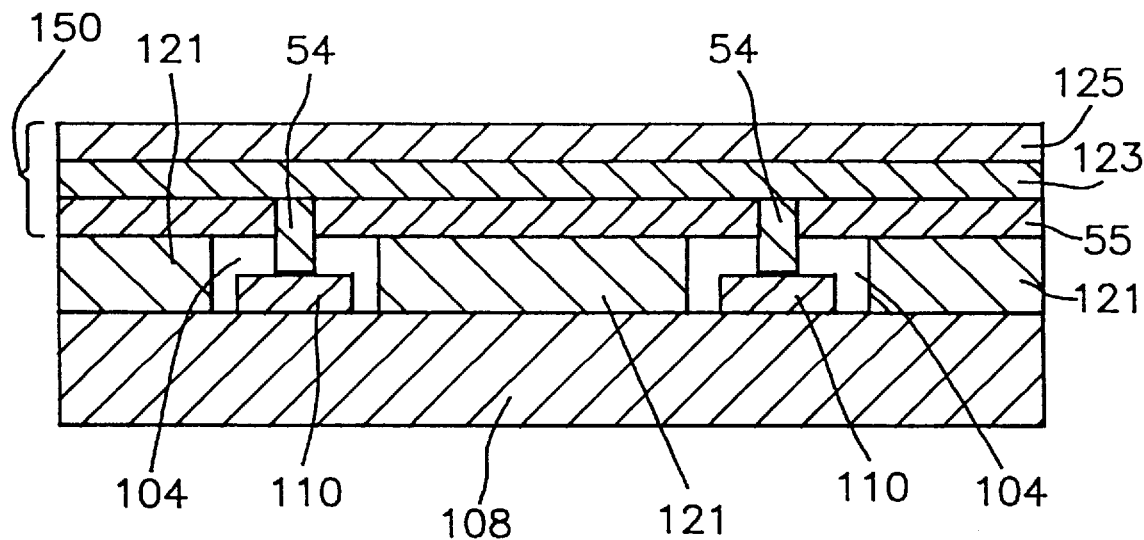
Figure 1G:
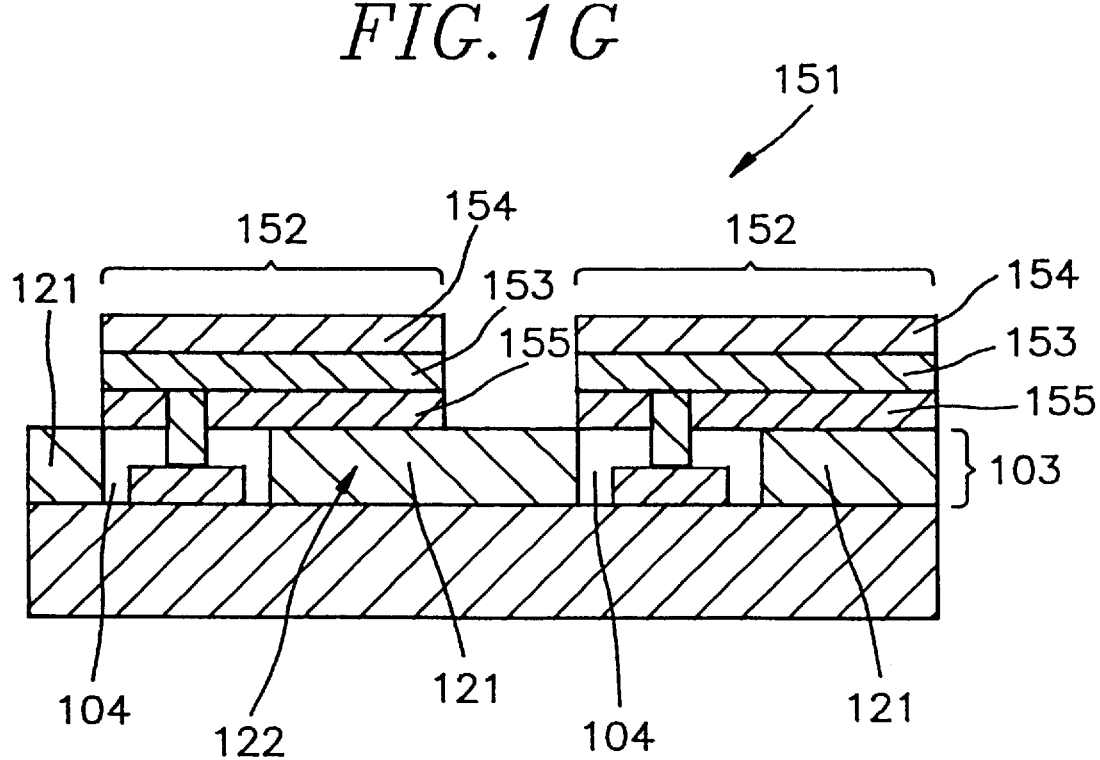
Figure 1H:
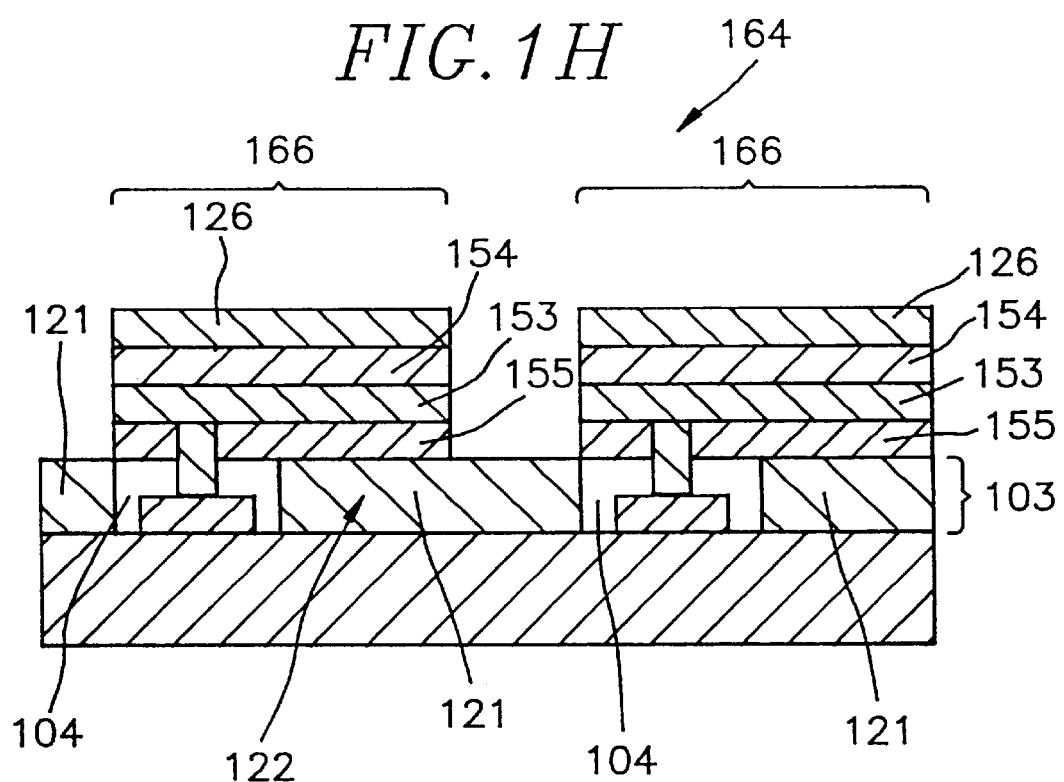
Figure 1I:
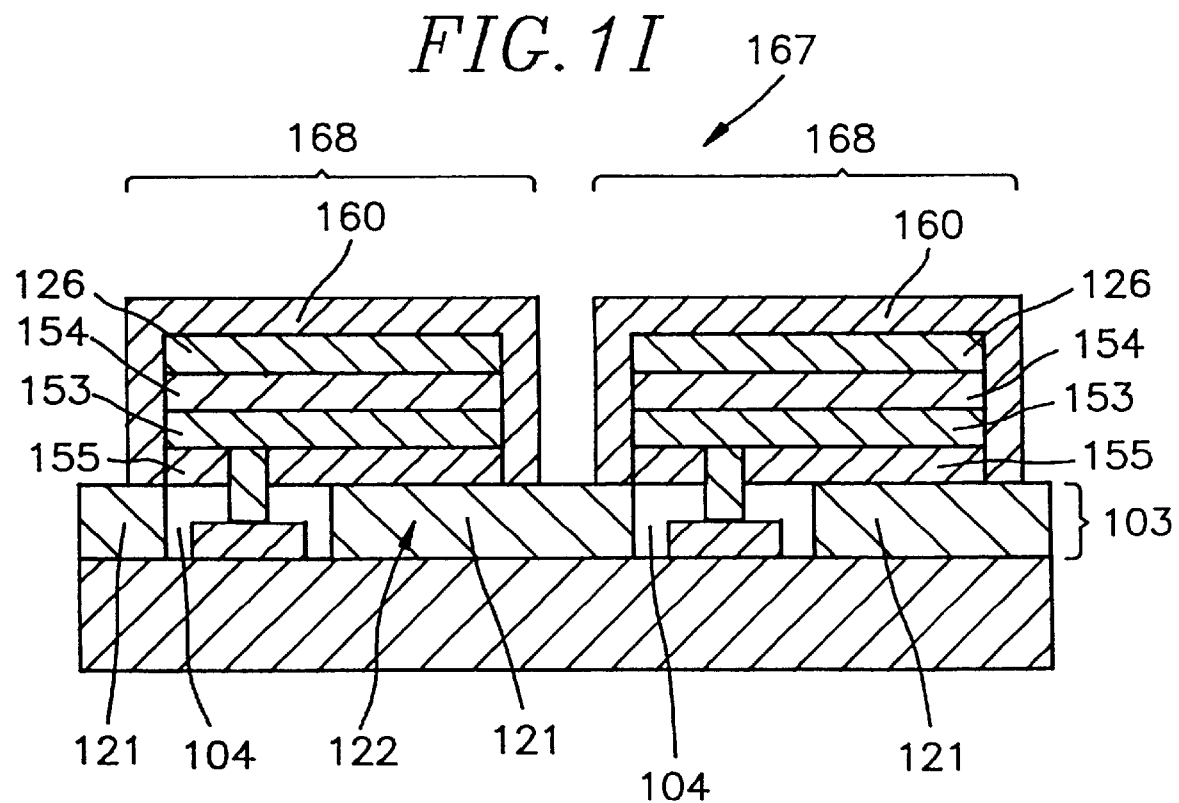
Figure 1J:
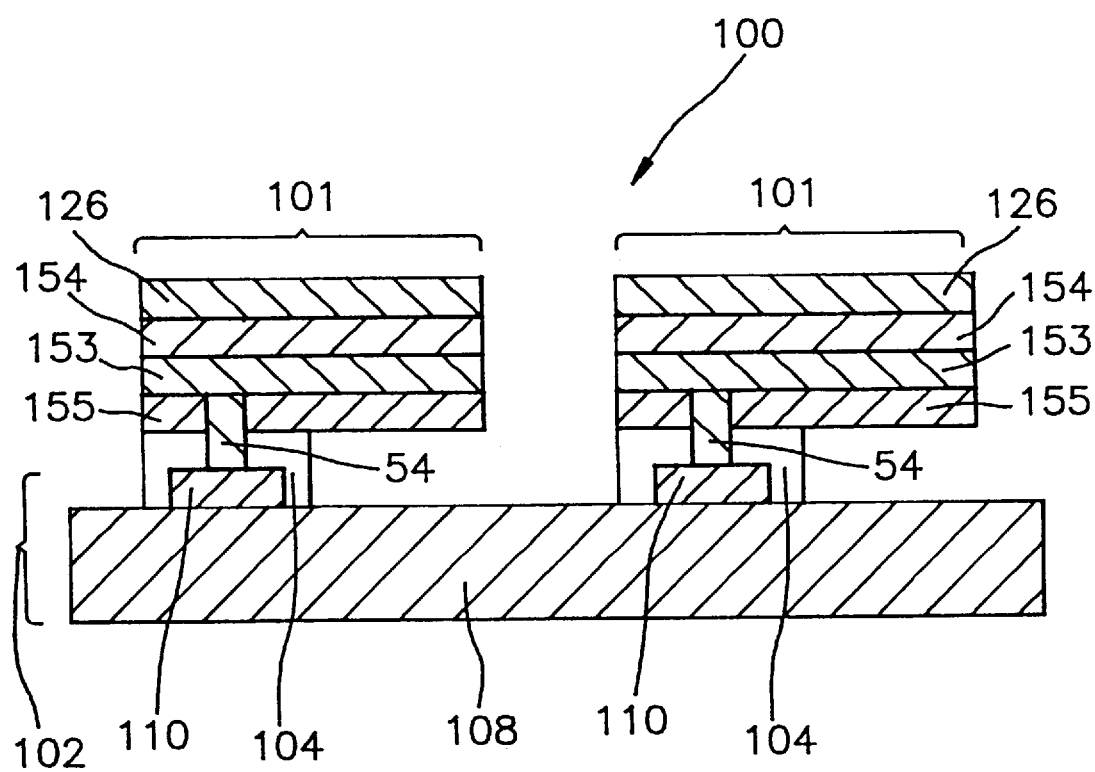

Referring now to FIGS. 2A to 2F, there are provided schematic cross sectional views explaining the inventive method for manufacturing an array 200 of M×N thin film actuated mirrors 201 for use in an optical projection system, wherein M and N are integers, in accordance with preferred embodiments of the present invention. It should be noted that like parts appearing in FIGS. 2A to 2F are represented by like reference numerals.

Figure 2A:
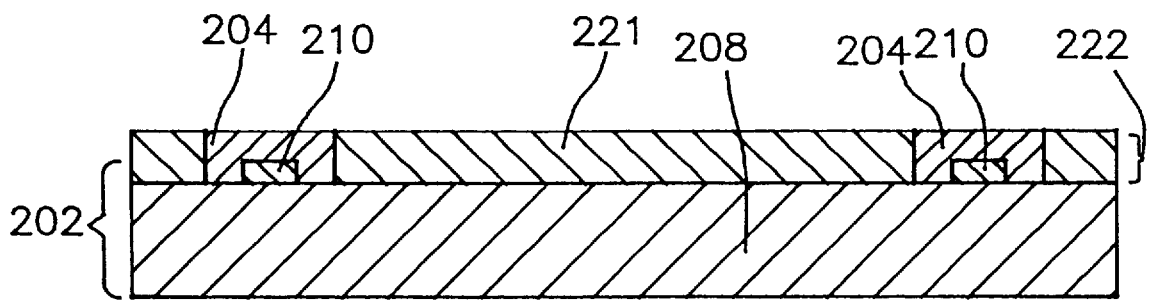
FIGS. 2A to 2F provide schematic cross sectional views explaining the inventive method for manufacturing an array of M×N thin film actuated mirrors.

As shown in FIG. 2A, the process for manufacturing the array 200 begins with the preparation of an active matrix 202, having a top surface and including a substrate 208 with an array of M×N connecting terminals 210 and an array of M×N transistors(not shown), wherein the substrate 208 is made of an insulating material, e.g., glass.

Thereafter, there is formed on the top surface of the active matrix 202 a thin film sacrificial layer 221 having a thickness of 1–2 $\mu$m and made of a metal, e.g., copper(Cu) or nickel(Ni), a phosphor-silicate glass(PSG) or a poly-Si. The thin film sacrificial layer 221 is formed by using a sputtering or an evaporation method if the thin film sacrificial layer 221 is made of a metal, a chemical vapor deposition(CVD) method or a spin coating method if the thin film sacrificial layer 221 is made of a PSG, and a CVD method if the thin film sacrificial layer 221 is made of a poly-Si.

Subsequently, there is formed a supporting layer 222 consisting of an array of M×N supporting members 204 and the thin film sacrificial layer 221. The supporting layer 222 is formed by: creating an array of M×N empty slots(not shown) by using a photolithography method, each of the empty slots being located around each of the connecting terminals 210; and forming a supporting member 204, made of a first insulating material, e.g., silicon nitride, in each of the empty slots located around each of the connecting terminals 210, by using a sputtering or a CVD method.

Figure 2B:
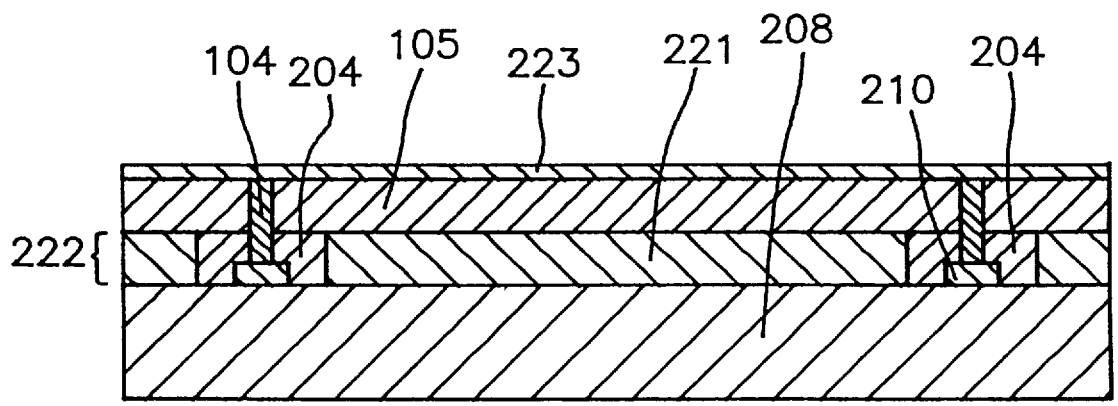

As shown in FIG. 2B, an elastic layer 105, made of a second insulating material, e.g., silicon nitride, and having a thickness of 500–2000 Å, is formed on top of the supporting layer 222 by using a Sol-Gel, a sputtering or a CVD method.

Thereafter, there is formed an array of M×N conduits 104, wherein each of the conduits 104 is made of a metal, e.g., aluminum(Al), and is used for providing an electric signal to each of the actuated mirrors 201. The array of M×N conduits 104 is formed by: first creating an array of M×N holes(not shown), each of the holes extending from top of the elastic layer 105, passing through each of the supporting members 204, to top of each of the connecting terminals 210 by using an etching method; and filling therein with the metal by using a sputtering method.

Subsequently, a second thin film layer 223, made of an electrically conducting material, e.g., platinum(Pt), platinum/titanium(Pt/Ti), and having a thickness of 0.1–2 $\mu$m, is formed on top of the elastic layer 105 by using a sputtering or a vacuum evaporation method.

Figure 2C:
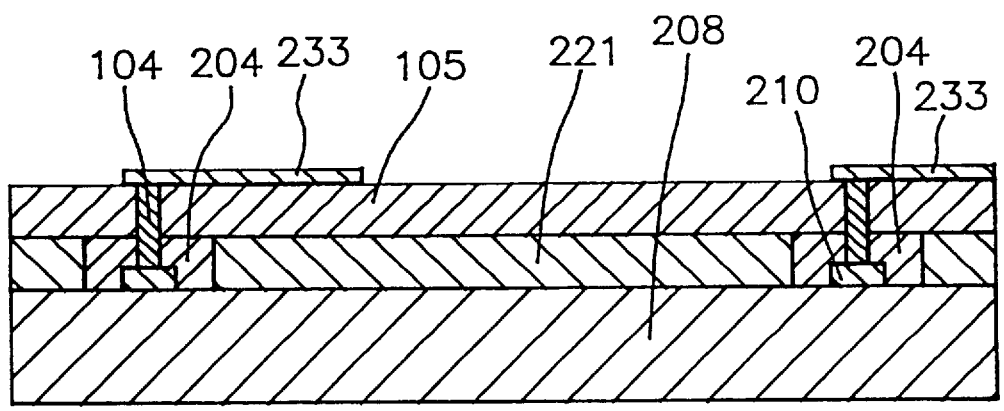

In the ensuing step, as shown in FIG. 2C, the second thin film layer 223 is patterned into an array of M×N second thin film electrodes 233 by using a lift-off method, wherein each of the second thin film electrodes 233 is connected electrically to each of the transistors through each of the conduits 104. Each of the second thin film electrodes 233 functions as a signal electrode in the thin film actuated mirrors 201.

Figure 2D:
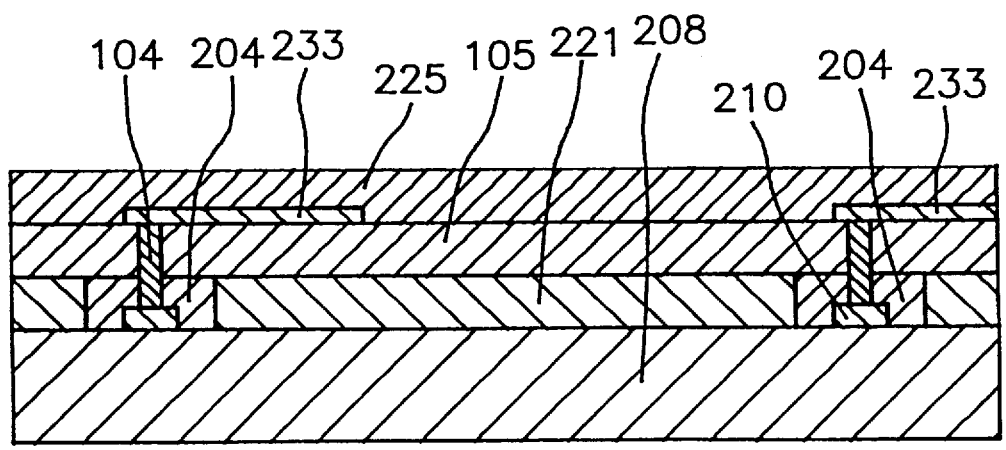

Thereafter, as shown in FIG. 2D, a thin film electrodisplacive layer 225, made of a piezoelectric material, e.g., lead zirconium titanate(PZT), or an electrostrictive material, e.g., lead magnesium niobate(PMN), and having a thickness of 0.1–2 μm, is formed on top of the elastic layer 105 and the array of M×N second thin film electrodes 233 by using a Sol-Gel or a sputtering method. The thin film electrodisplacive layer 225 is then heat treated to allow a phase transition to take place.

Figure 2E:
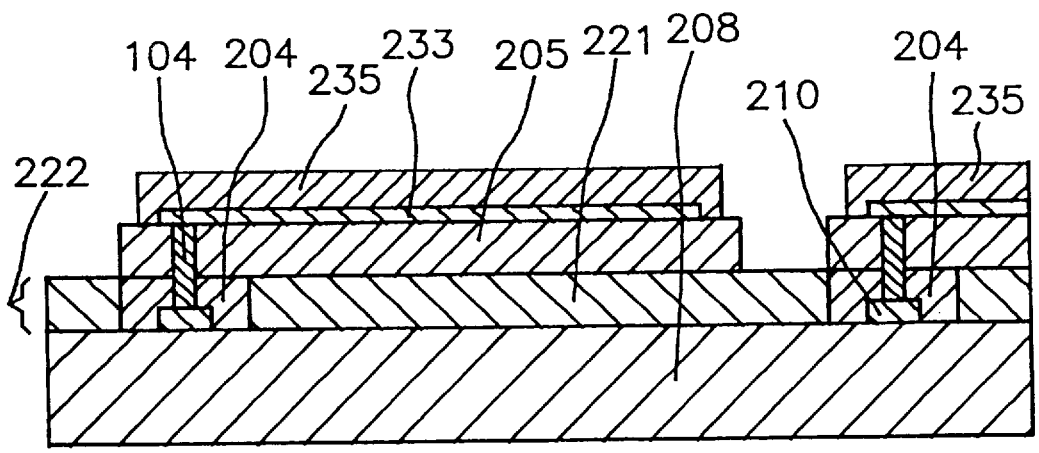

As shown in FIG. 2E, the thin film electrodisplacive layer 225 is patterned into an array of M×N thin film electrodisplacive members 235, wherein each of the thin film electrodisplacive members 235 surrounds each of the second thin film electrodes 233, by using a photolithography or a laser trimming method. Thereafter, the elastic layer 105 is patterned into an array of M×N elastic members 205 by using a photolithography or a laser trimming method, to thereby expose portions of the supporting layer 222. Since each of the thin film electrodisplacive members 235 is sufficiently thin, there is no need to pole it in case it is made of a piezoelectric material: for it can be poled with the electric signal applied during the operation of the thin film actuated mirrors 201. The heat treatment for forcing the phase transition can also take place after the formation of the array of M×N thin film electrodisplacive members 235 or after the formation of the array of M×N elastic members 205.

In the ensuing step, a first thin film layer(not shown), made of an electrically conducting and light reflecting material, e.g., aluminum(Al), gold(Au) or platinum(Pt), and having a thickness of 500–2000 Å, is formed on top of the thin film electrodisplacive members 235, the elastic members 205 and the exposed portions of the supporting layer 222 by using a sputtering or a vacuum evaporation method.

Thereafter, the first thin film layer is patterned into an array of M×N first thin film electrodes 226 by using a lift-off method, wherein each of the first thin film electrodes 226 surrounds each of the thin film electrodisplacive members 235 and covers portions of each of the elastic members 205. Each of the first thin film electrodes 226 functions as a mirror as well as a bias electrode in the thin film actuated mirrors 201.

Figure 2F:
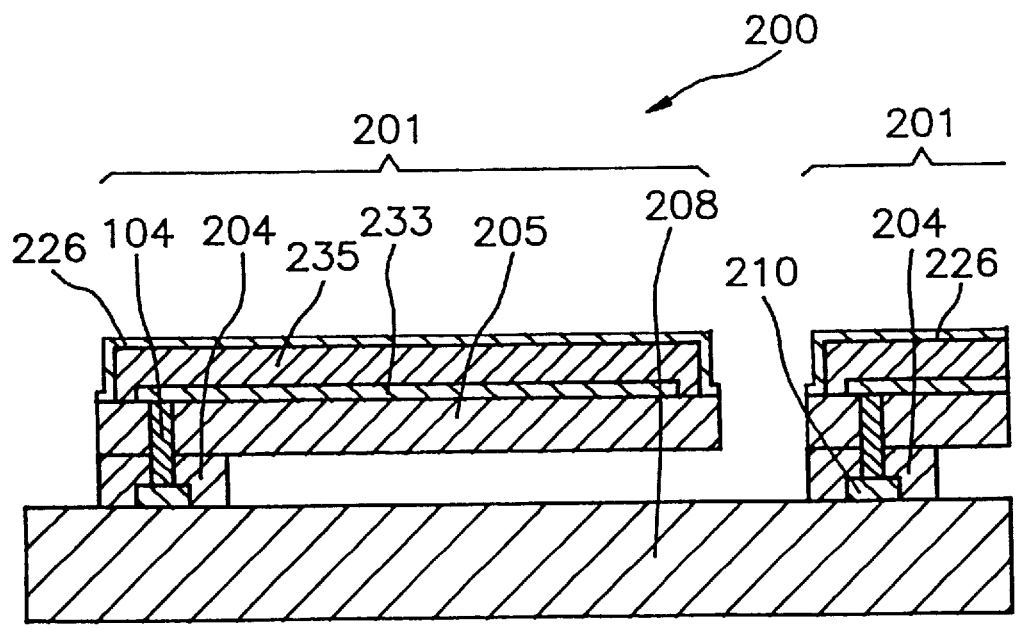

Subsequently, the thin film sacrificial layer 221 is removed by using an etching method to thereby form the array 200 of M×N thin film actuated mirrors 201, as shown in FIG. 2F.

In contrast with the method for forming the array of M×N thin film actuated mirrors disclosed previously, in the inventive method, each of the first thin film electrodes 226 surrounding each of the thin film electrodisplacive members 235 and covering the portions of each of the elastic members 205 prevents the chemical attacks on the thin film layers during the removal of the thin film sacrificial layer 221 in the supporting layer 222.

While the present invention has been described with respect to certain preferred embodiments only, other modifications and variations may be made without departing from the scope of the present invention as set forth in the following claims.

What is claimed is:

1. A method for manufacturing an array of actuated mirrors for use in an optical projection system on a substrate having an array of connecting terminals, the method comprising the steps of:

forming a sacrificial layer on top of the substrate;

removing portions of the sacrificial layer around each of the connecting terminals to expose the connecting terminals;

forming a supporting member, made of an insulating material, in each of the removed portions of the sacrificial layer;

depositing an elastic layer on top of the sacrificial layer and the supporting members; forming an array of conduits;

forming an array of first electrodes on top of the elastic layer;

forming an array of electrodisplacive members, wherein each of the electrodisplacive members covers each of the first electrodes;

heat treating the electrodisplacive members to allow a phase transition to take place;

patterning the elastic layer into an array of elastic members:

forming an array of second electrodes, wherein each of the second electrodes covers each of the electrodisplacive members; and removing the sacrificial layer, thereby forming the array of actuated mirrors.

2. The method of claim 1, wherein the second electrodes are made of an electrically conducting and light reflecting material.

3. The method of claim 1, wherein the first and the second electrodes are formed by using a sputtering or a vacuum evaporation method, followed by an etching method.

4. The method of claim 1, wherein the electrodisplacive members are made of a piezoelectric material.

5. The method of claim 1, wherein the electrodisplacive members are made of an electrostrictive material.

6. The method of claim 1, wherein the electrodisplacive members are formed by using a Sol-Gel or a sputtering method, followed by a photolithography or a laser trimming method.

7. The method of claim 1, wherein the elastic layer is deposited by using a Sol-Gel, a sputtering or a CVD method.

8. The method of claim 1, wherein each of the conduits extends from top of the elastic layer to top of each of the connecting terminals.

* * * * *